Figure 1:
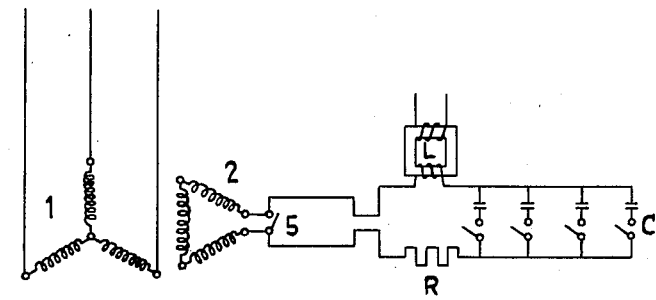
Figure 1:
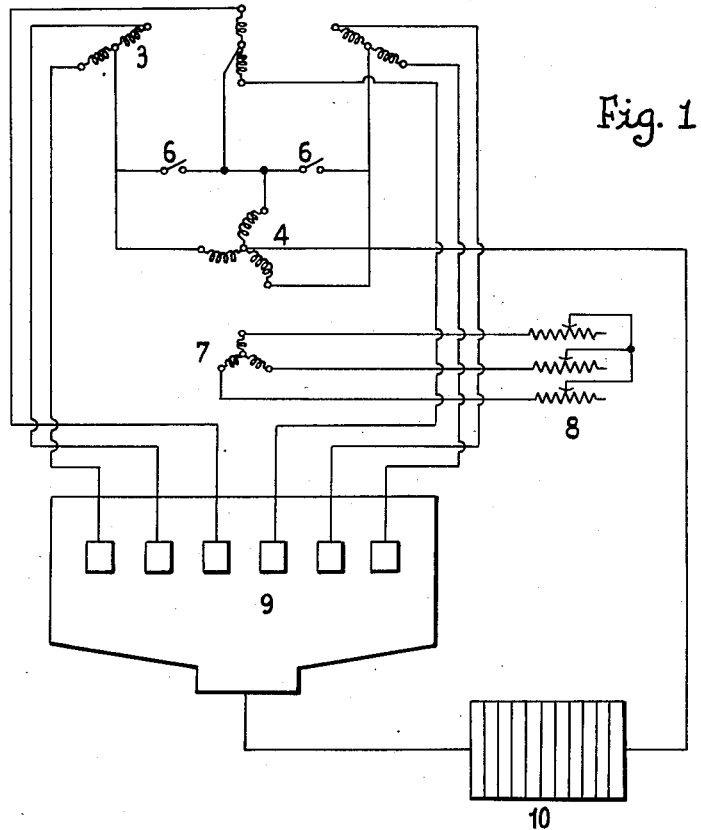

July 22, 1952 B. STORSAND 2,604,611
DEVICE FOR VOLTAGE REGULATION FOR RECTIFIER PLANTS
Filed March 3, 1948

Inventor:
Bjarne Storsand,
by Singer, Ehlert, Stern & Carlberg
Attorneys.

UNITED STATES PATENT OFFICE 2,604,611

DEVICE FOR VOLTAGE REGULATION FOR RECTIFIER PLANTS

Bjarne Storsand, Zurich, Switzerland, assignor to Maschinenfabrik Oerlikon, Zurich-Oerlikon, Switzerland, a Swiss firm Application March 3, 1948, Serial No. 12,882
In Switzerland March 5, 1947

7 Claims. (Cl. 315—143)

It is known to obtain in rectifier installations three various voltages by switching the secondary windings of the rectifier transformer with three one phase push-pull connections to double three phase absorption connections and then by short circuiting the absorption-reactance coil (also known as the phase-equaliser coil or inter-phase transformer) of which voltages the theoretical no-load values range from 0.9 to 1.17 and 1.35 Ea. The usefulness of this arrangement is however reduced by the fact that the switching for changing from 1.17 to 1.35 requires a break in the current flow. Hence the switch elements for the conversion are subject to considerable loads and stresses especially when also the absorption-reactance coil must be switched.

These difficulties are avoided according to the invention by an arrangement in which the transformer primary is star-connected and in which as a result of the magnetic connection of each phase an anode conduction period of 120° is obtained and in which means are provided which permit this action to be modified in order to control the period of anode current flow and obtain regulation of the voltage.

It is also an object of the invention to extend the period of anode conduction by arranging the secondary winding of the transformer in treble one phase push-pull connection and by providing a three phase absorption-reactance coil of which the action can be progressively modified by disconnection, short circuiting or the like. Thereby the conducting period of the anodes can be varied from 120° to 200–240° and the voltage can be varied from 1.17 times the anode voltage to about 0.75 times the anode voltage.

Another object of the invention is to shorten the period of anode conduction by arranging an open delta tertiary winding to the transformer which winding is adapted to be shorted by a variable impedance whereby the conduction period can be shortened from 120° to about 60° and the voltage increased from 1.17 times Ea to 1.35 times Ea.

In the operation of a rectifier the voltage of the direct current is in a predetermined ratio to the voltage of the alternating current of the transformer. The theoretical value of the direct current voltage Ug is as follows:

$$Ug = \sqrt{2} \cdot Ea \cdot \frac{\sin\frac{\alpha}{2}}{\frac{\alpha}{2}}$$

wherein Ea is the voltage of the secondary winding of the transformer between the rectifier anode and the zero point and $\alpha$ the conduction period of one anode.

When employing six anode and 60° conduction Ug 1.35 Ea
When employing six anode and 120° conduction Ug 1.17 Ea
When employing six anode and 180° conduction Ug .90 Ea
When employing six anode and 240° conduction Ug .75 Ea Therefore, it is possible to vary the direct current voltage when the conduction periods of the anodes is varied.

The single figure of the drawing illustrates a constructive example of the invention in diagrammatic manner. 1 is the primary transformer winding in star connection, 2 the tertiary winding, 3 the secondary windings, 4 is the absorption-reactance coil for one phase push-pull connection and 5 the switch for the tertiary winding. 6 and 6ª represent two switches for short circuiting the reactor coil 4. 7 is a secondary winding and 8 an adjustable impedance. 9 is the rectifier and 10 the load consisting for instance, of an electrochemical series of cells.

The operation of the device shown is as follows:

For the lowest voltage step all switches are open. As a result of the yoke leakage due to the primary star connection in this case the overlapping of the phases in the one phase push-pull connection is about 60° and the voltage is about 20 to 25% lower than in normal one phase push-pull connection (Ug=about 0.7 Ea). For the next voltage step the switch 5 is closed and operation is in the normal one phase push-pull connection (Ug=0.9 Ea). For the third step the three phases of the absorption reactance coil are shorted by means of the switches 6, the switch 5 remaining open. As a result of the magnetic leakage two anodes now operate simultaneously as in double three phase absorption connection with a voltage of Ug=1.17 Ea. Next the switch 5 can be again closed and operation is effected in simple six phase connection with Ug=1.35 Ea.

Instead of the switches adjustable impedances can be used so that this operation may be effected with continuous variation, and a regulating range of 1.35 to 0.7 that is nearly 50%, is obtained.

Switches are shown for control purposes but for each an adjustable impedance circuit can also be used such as for example a variable oscillatory circuit consisting of an inductance L, capacity C and an ohmic resistance R. This oscillatory circuit is used here instead of the switch 5. As variable impedances reactor coils can be used which are subject to a direct magnetising current and operating if desired in conjunction with condensers. In order to close the tertiary circuit which carries the third harmonic alternating current an adjustable oscillatory circuit is especially suitable, consisting of L, C and R in series whereby the inductance L can be varied by direct current pre-magnetisation.

In order to avoid having asymmetric voltage curves as a result of the saturation, two reactance coils are connected in series which are preferably magnetised in the opposite senses. Also the capacity can be altered by connecting and disconnecting single components since it is desirable that the impedance can be varied from an inductive value at the lowest voltages, through the resonance position to a capacitative value in order to increase the working range of the regulation. The capacitative components of the tertiary components serve to assist commutation and tend to increase the direct current voltage. Reactance coils alone, with direct current magnetisation, can be used for the switches 6; this magnetisation can be effected in desired manner also by the main current in order to effect voltage compensation.

Also only a part of the regulating range of this arrangement may be used if such a wide range as about 50% is not necessary. For many installations it would suffice if the above steps 1.17 to 1.35 were used in which case the absorption-reactance coil is omitted and means are merely provided for controlling the operation of the tertiary winding which is advantageous for example for railway installations and for constant voltage supply systems while for high current rectifiers the three lower steps are of particular application.

The yoke flux (magnetic coupling) can, if the flux path through air is insufficient, be effected by means of an additional magnetic connection; this is necessary especially for plants which are to function also at a low load. Also a unit consisting of three one phase transformers is particularly suitable for this purpose.

The arrangement can be used in conjunction with known means for voltage regulation such as step switches, induction regulators or grid control devices.

Instead of bridging the absorption-reactance coil 4 by the switches 6, 6ª this can also be closed stepwise or it may be provided with a secondary winding 7 which is progressively shorted by means of a variable impedance 8.

Besides the above four main voltage steps of 0.7, 0.9, 1.17 and 1.35 times E$a$, corresponding to 240°, 180°, 120° and 60° of the theoretical conduction period, there still remains the possibility, when using two six phase connections positioned relatively by 30° one to the other, of obtaining a voltage step of 1.24 times E$a$ in treble four phase connection, since from the six one phase push-pull systems three four phase systems can be produced which are coupled by the three core absorption-reactance coil already present. This step is especially advantageous for electrochemical plants where the step 1.35 times E$a$ (60°) gives too high an anode load.

It is also possible to obtain the same result if instead of the tertiary winding one of the star windings is short circuited on itself outside the transformer towards the zero point, by the means of a multi-core absorption-reactance coil so that the higher harmonics can be produced therein.

What I claim is:

1. In a device for regulating the voltage of rectifiers having six anodes and a single cathode, a three phase rectifier transformer having a star connected primary winding and a secondary winding provided with treble one phase push-pull connections, in which the ends of the three separate secondary phase windings are connected to said six anodes, a delta connected tertiary winding, means adapted to open and close said tertiary winding, an absorption-reactance coil for said one phase push-pull connections, and switching means adapted to short circuit said absorption-reactance coil.

2. A device according to claim 1, in which said switching means comprise variable impedances.

3. A device according to claim 1, in which an oscillatory circuit is employed for closing said tertiary winding.

4. A device according to claim 1, in which an oscillatory circuit is employed for closing said tertiary winding, at least one of the values of L, C and R in said oscillatory circuit being adjustable to permit this circuit to be varied from an inductive impedance to a capacitative impedance.

5. In a device for regulating the voltage of rectifiers having six anodes and a single cathode, a three phase rectifier transformer having a star connected primary winding and a secondary winding provided with treble one phase push-pull connections, in which the ends of the three separate secondary phase windings are connected to said six anodes, a delta connected tertiary winding, means adapted to selectively open and close said tertiary windings, an absorption-reactance coil for said one phase push-pull connections, and means for switching out said absorption-reactance coil in steps.

6. In a device for regulating the voltage of rectifiers having six anodes and a single cathode, a three phase rectifier transformer having a star connected primary winding and a secondary winding provided with treble one phase push-pull connections, in which the ends of the three separate secondary phase windings are connected to said six anodes, an absorption-reactance coil for said one phase push-pull connections, and means for switching out said absorption-reactance coil in steps, said last named means comprising a separate winding arranged on said absorption reactance coil and a variable impedance adapts to short circuit said separate winding.

7. In a three phase rectifier transformer, a star connected primary winding and a secondary winding provided with treble one phase connections in which the ends of three separate secondary phase windings are adapted to be connected to six anodes of a rectifier, a delta connected tertiary winding, and means adapted to open and close said tertiary winding.

BJARNE STORSAND.

The following references are of record in the file of this patent:

UNITED STATES PATENTS

| Number | Name | Date |
|---|---|---|
| 644,051 | Berg | Feb. 27, 1900 |
| 1,485,361 | Bauch | Mar. 4, 1924 |
| 1,712,504 | Kubler | May 14, 1929 |
| 1,712,569 | Kubler | May 14, 1929 |
| 1,839,148 | Greene | Dec. 29, 1931 |
| 1,994,715 | Kern et al. | Mar. 19, 1935 |